United States Patent
Park (10) Patent No.: US 8,044,939 B2
(45) Date of Patent: Oct. 25, 2011

(54) MOBILE TERMINAL HAVING DIGITAL BROADCAST RECEPTION CAPABILITY AND PIP DISPLAY CONTROL METHOD

(75) Inventor: Hong Chan Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 916 days.

(21) Appl. No.: 11/840,105

(22) Filed: Aug. 16, 2007

(65) Prior Publication Data

US 2008/0074550 A1  Mar. 27, 2008

(30) Foreign Application Priority Data

Sep. 25, 2006  (KR) .................. 10-2006-0092848

(51) Int. Cl.
*G09G 3/041* (2006.01)
*G06F 3/00* (2006.01)

(52) U.S. Cl. ........................ 345/173; 715/762
(58) Field of Classification Search .......... 345/173–178, 345/169; 348/565; 715/808, 846, 761–765
See application file for complete search history.

(56) References Cited

U.S. PATENT DOCUMENTS

| | | | |
|---|---|---|---|
| 2003/0025676 A1* | 2/2003 | Cappendijk | 345/173 |
| 2003/0193484 A1* | 10/2003 | Lui et al. | 345/173 |
| 2003/0208751 A1* | 11/2003 | Kim et al. | 725/1 |
| 2004/0012572 A1* | 1/2004 | Sowden et al. | 345/173 |
| 2004/0155982 A1* | 8/2004 | Jeong | 348/565 |
| 2005/0267676 A1* | 12/2005 | Nezu et al. | 701/200 |
| 2006/0033838 A1* | 2/2006 | Choi | 348/441 |
| 2006/0109198 A1 | 5/2006 | Chow et al. | |
| 2006/0150230 A1* | 7/2006 | Chung et al. | 725/118 |
| 2006/0176399 A1 | 8/2006 | Kwak et al. | |
| 2006/0227247 A1* | 10/2006 | Lee | 348/569 |
| 2007/0057866 A1* | 3/2007 | Lee et al. | 345/1.1 |

FOREIGN PATENT DOCUMENTS

| | | | |
|---|---|---|---|
| JP | 2006-139615 | * | 6/2006 |
| KR | 1997-0031883 | | 6/1997 |
| KR | 10200500914223 | | 9/2005 |

OTHER PUBLICATIONS

English Translation of JP 2006-139615.*

* cited by examiner

*Primary Examiner* — Amare Mengistu
*Assistant Examiner* — Hong Zhou
(74) *Attorney, Agent, or Firm* — The Farrell Law Firm, P.C.

(57) ABSTRACT

A mobile terminal capable of digital broadcast reception and supports a touch screen function, and a picture-in-picture (PIP) display control method for the mobile terminal. The PIP display control method includes processing a received digital broadcast signal into channel signals of individual channels, displaying video data of a selected channel signal on a main screen occupying an entire display area, and displaying video data of another selected channel signal on a sub-screen in the main screen; checking whether a touch event occurs to one of the main screen and the sub-screen; displaying control icons on one of the touched main screen and the touched sub-screen when a touch event occurs to one of the main screen and the sub-screen; and controlling digital broadcasts on channels associated with the main screen and sub-screen in response to occurrence of touch events to the control icons.

22 Claims, 8 Drawing Sheets

MOBILE TERMINAL HAVING DIGITAL BROADCAST RECEPTION CAPABILITY AND PIP DISPLAY CONTROL METHOD

PRIORITY

This application claims priority to an application filed in the Korean Intellectual Property Office on Sep. 25, 2006 and assigned Serial No. 2006-92848, the contents of which are incorporated herein by reference.

BACKGROUND OF THE INVENTION

1. Field of the Invention

The present invention relates generally to a mobile terminal and, more particularly, to a mobile terminal capable of digital broadcast reception and supporting a touch screen function, and to a picture-in-picture (PIP) display control method enabling separate control of a main screen and a sub-screen for the mobile terminal.

2. Description of the Related Art

In digital broadcasting, a broadcasting station broadcasts a digitally modulated multimedia signal including audio, video and text. Broadcast receivers receive and reproduce the broadcast multimedia signal. Digital multimedia broadcasting (DMB) and digital video broadcasting (DVB) are examples of digital broadcasting. DMB may be divided into terrestrial DMB or satellite DMB.

To extend multimedia features, advanced mobile terminals, such as mobile communication terminals, notebook computers, personal digital assistants, personal multimedia players, etc., have recently been equipped with digital broadcast receivers.

In particular, a mobile terminal supporting a PIP feature enables simultaneous viewing of two digital broadcasts on a main screen and a sub-screen. For example, video images on the main channel are displayed on the main screen occupying the entire display area, and video images on the PIP channel are displayed on the small sub-screen within the main screen.

In a mobile terminal supporting a conventional PIP feature, a user has to select the main screen or the sub-screen through key inputs for switching broadcast channels or adjusting audio volumes. Hence, a user is inconvenienced by having to input a plurality of keys to switch broadcast channels or to adjust audio volumes for the main screen and the sub-screen. For example, a user inputs a key to select the main screen, and inputs another key to switch broadcast channels or to adjust audio volume for the main screen. Then, the user inputs another key to select the sub-screen, and inputs another key to switch broadcast channels or to adjust audio volume for the sub-screen.

Further, because display operations of a mobile terminal supporting the conventional PIP feature are controlled in a preset rigid manner, display control operations, such as exchanging between the main channel and PIP channel, adjusting size of the sub-screen, moving the sub-screen, etc., are difficult to use.

SUMMARY OF THE INVENTION

The present invention has been made in view of the above problems, and an object of the present invention is to provide a mobile terminal capable of digital broadcast reception and supporting a touch screen function, and to provide a PIP display control method enabling separate control of a main screen and a sub-screen for the mobile terminal.

Another object of the present invention is to provide a mobile terminal and PIP display control method for the same wherein channel switching operations and volume adjustment operations for a main screen and a sub-screen are easily and separately performed.

Another object of the present invention is to provide a mobile terminal and PIP display control method for the same wherein exchanging between a main channel and PIP channel, and size adjustment and movement of a sub-screen can be easily performed.

In accordance with an aspect of the present invention, there is provided a PIP display control method for a mobile terminal that is capable of digital broadcast reception and supports a touch screen function, the method including processing a received digital broadcast signal into channel signals of individual channels, displaying video data of a selected channel signal on a main screen occupying an entire display area, and displaying video data of another selected channel signal on a sub-screen in the main screen; checking whether a touch event occurs to one of the main screen and the sub-screen; displaying control icons on one of the touched main screen and the touched sub-screen when a touch event occurs to one of the main screen and the sub-screen; and controlling, digital broadcasts on channels associated with the main screen and sub-screen in response to occurrence of touch events to the control icons.

The control icons may include channel switching icons and volume adjustment icons. The control icons may be displayed at border regions of the corresponding main screen and sub-screen. Each control icon has a preset size and may include control portions at opposite ends and an icon hiding portion between the control portions. The control icons displayed on the sub-screen may be resized according to size-adjustment of the sub-screen.

The controlling step may include switching a current channel associated with the touched channel switching icon to a new channel in response to occurrence of a touch event to the control portion of a channel switching icon. The controlling step may also include adjusting audio volume of a channel associated with the touched volume adjustment icon in response to occurrence of a touch event to one of the control portions of a volume adjustment icon.

The PIP display control method may further include hiding the touched control icon from one of the main screen and sub-screen in response to occurrence of a touch event to the icon hiding portion of a control icon. The PIP display control method may further include hiding the touched control icon from one of the main screen and sub-screen when a preset time duration has elapsed after occurrence of the most recent touch event to a control icon.

The controlling step may include adjusting digital broadcasts on channels associated with the main screen and sub-screen according to size and direction of a corresponding drag when an occurred touch event is a drag event. According to size and direction of a drag, activity occurs selected from the group consisting of exchanging channels associated with the main screen and sub-screen with each other, resizing the sub-screen, and moving the sub-screen.

In accordance with another aspect of the present invention, there is provided a mobile terminal capable of digital broadcast reception, the mobile terminal including a display unit having a touch screen capability, for displaying video images; a broadcast receiving unit for receiving a digital broadcast signal; a signal processor for processing the received digital broadcast signal into channel signals of individual channels, displaying video data of a selected channel signal on a main screen occupying an entire display area of the display unit, and displaying video data of another selected channel signal on a sub-screen in the main screen, to support a PIP feature; a touch signal processor for detecting a touch event to one of the main screen and sub-screen and obtaining position data of the detected touch event; an icon controller for displaying control icons on one of the touched main screen and touched sub screen based on position data obtained by the touch signal processor; and a PIP display controller for controlling digital broadcasts on channels associated with the main screen and sub-screen in response to occurrence of touch events to the control icons.

In accordance with still another aspect of the present invention, there is provided a PIP display control method for a mobile terminal that is capable of digital broadcast reception and supports a touch screen function, the method including processing a received digital broadcast signal into channel signals of individual channels, displaying video data of a selected channel signal on a main screen occupying an entire display area, and displaying video data of another selected channel signal on a sub-screen in the main screen; checking whether a drag event occurs to one of the main screen and the sub-screen; and controlling digital broadcasts on channels associated with the main screen and sub-screen according to size and direction of a corresponding drag when a drag event occurs.

The controlling step may include exchanging the channels associated with the main screen and sub-screen with each other when the occurred drag event corresponds to a drag from the main screen to the sub-screen. The sub-screen may be enlarged when the occurred drag event corresponds to a drag from the sub-screen to the main screen. The sub-screen may be reduced when the occurred drag event corresponds to a drag from a border region of the sub-screen to a center thereof. The sub-screen may be resized in proportion to a length of the drag. Control icons may be displayed on the sub-screen and the control icons may be resized in proportion to a size of the sub-screen. The sub-screen may be moved in a direction of the drag when the occurred drag event corresponds to a drag from a center of the sub-screen to a border region thereof.

BRIEF DESCRIPTION OF THE DRAWINGS

The above and other objects, features and advantages of the present invention will be more apparent from the following detailed description in conjunction with the accompanying drawings, in which:

FIGS. 6A to 9B illustrate examples of screen representations for the method of FIG. 5.

DETAILED DESCRIPTION OF PREFERRED EMBODIMENTS

Hereinafter, preferred embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

Figure 1:
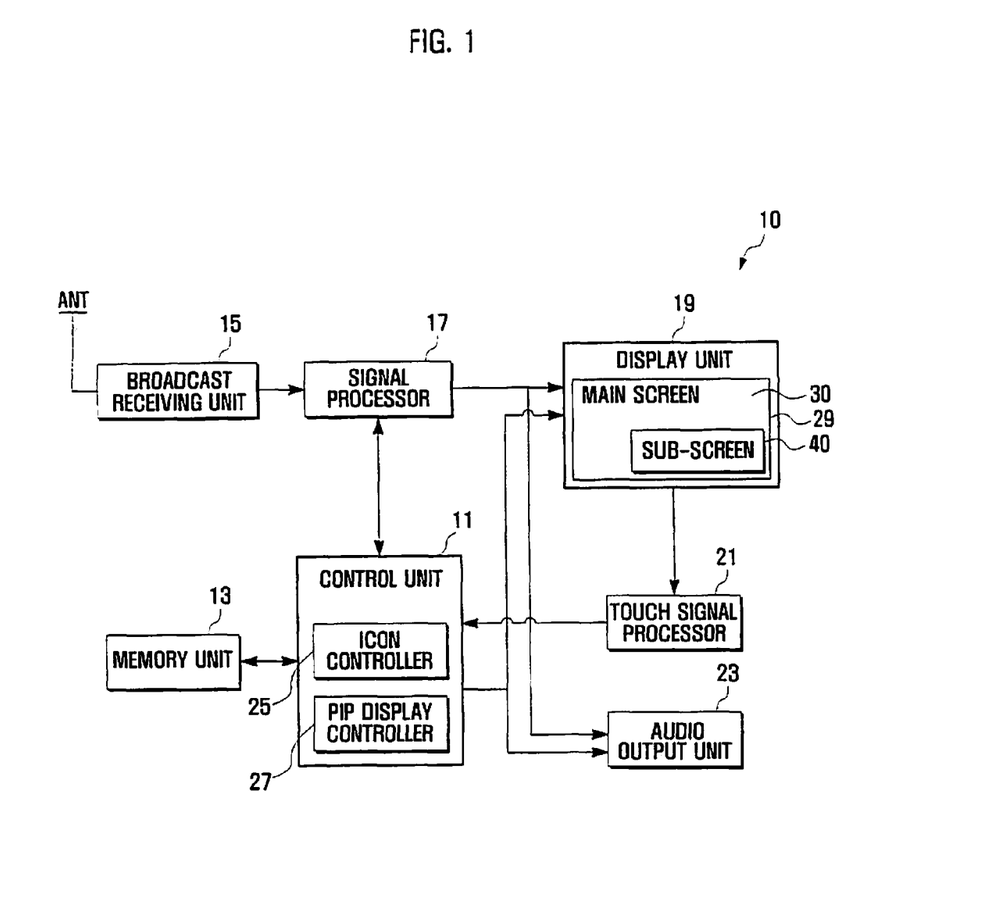
FIG. 1 illustrates a configuration of a mobile terminal capable of digital broadcast reception and supporting a touch screen function according to the present invention.
Figure 2:
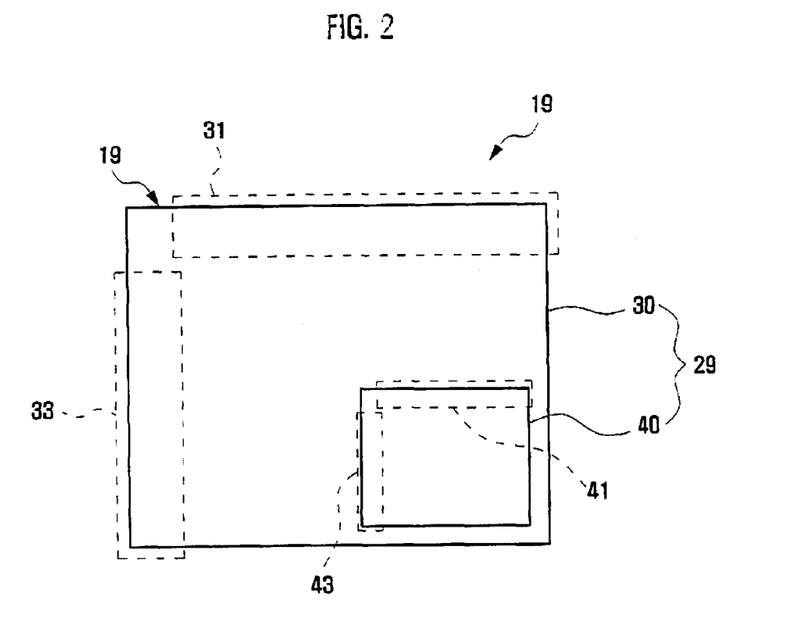
FIG. 2 illustrates a layout of a display screen of the mobile terminal in FIG. 1.
Figure 3:
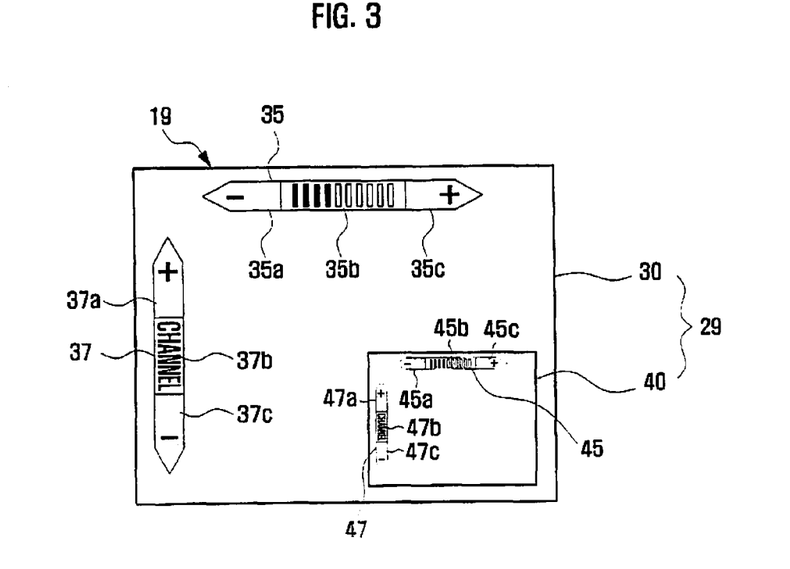
FIG. 3 illustrates control icons on the display screen in FIG. 2.

FIG. 1 shows a mobile terminal capable of digital broadcast reception and supporting a touch screen function according to the present invention. FIG. 2 shows a display screen of the mobile terminal in FIG. 1. FIG. 3 shows control icons on the display screen in FIG. 2.

Referring to FIG. 1, the mobile terminal 10 includes a control unit 11, a memory unit 13, a broadcast receiving unit 15, a signal processor 17, a display unit 19, a touch signal processor 21, and an audio output unit 23.

The control unit 11 controls overall operation of the mobile terminal 10. In particular, the control unit 11 controls operations related to digital broadcast reception and a picture-in-picture (PIP) feature.

The memory unit 13 stores control programs of the mobile terminal 10, and data resulting from execution of the control programs. In particular, the memory unit 13 stores programs for controlling operations related to digital broadcast reception and the PIP feature.

The broadcast receiving unit 15 receives a digital broadcast signal through an antenna ANT under the control of the control unit 11.

The signal processor 17 processes the received digital broadcast signal into channel signals on individual channels. In particular, when the PIP feature is active, the signal processor 17 outputs a video signal of a channel selected as the main channel to a main screen 30 occupying an entire display screen 29 of the display unit 19, and also outputs a video signal of another channel selected as the PIP channel to a sub-screen 40 within the main screen 30.

The display unit 19 includes a display window and a touch panel installed above the display window. The display unit 19 displays on the display screen 29 status information resulting from operations of the mobile terminal 10, various moving and still images, and video data from the signal processor 17. In particular, the display unit 19 sends to the touch signal processor 21 an analog electrical signal corresponding to a touch event generated by a user.

The touch signal processor 21 detects a touch event occurring to the display screen 29, and sends the detected touch event and associated position data to the control unit 11. When a touch extended in a particular direction is detected, the touch signal processor 21 recognizes the extended touch as a drag event.

The audio output unit 23 reproduces audio data from the signal processor 17. In particular, the audio output unit 23 includes audio output terminals for the PIP feature to output audio signals associated with the main channel and PIP channel. The audio output unit 23 may include a speaker for outputting a selected one of a main channel audio signal and PIP channel audio signal.

In particular, the control unit 11 includes an icon controller 25 and a PIP display controller 27. The icon controller 25 receives a touch event occurred on the display screen 29 and associated position data via the touch signal processor 21, and displays control icons 35, 37, 45 and 47 on the display screen 29, as shown in FIG. 3. The PIP display controller 27 controls digital broadcasts on the main channel and PIP channel in response to touch events occurring to the control icons 35, 37, 45 and 47. When a drag event occurs, the PIP display controller 27 adjusts digital broadcasts associated with the main screen 30 and sub-screen 40 according to the length and direction of the corresponding drag.

When a touch event occurs to the main screen 30, the icon controller 25 displays the control icons 35 and 37 on the main screen 30. When a touch event occurs to the sub-screen 40, the icon controller 25 displays the control icons 45 and 47 on the sub-screen 40. To reduce video images hidden by the control icons 35, 37, 45 and 47, the icon controller 25 displays the control icons 35, 37, 45 and 47 in the border regions 31, 33, 41 and 43 of the display screen 29, as shown in FIG. 2. The control icons 35, 37, 45 and 47 may be displayed in response to touch events occurring to an arbitrary portion of the display screen 29 or to the border regions 31, 33, 41 and 43 in which the control icons 35, 37, 45 and 47 are hidden.

The control icons 35, 37, 45 and 47 include channel icons 37 and 47, and volume icons 35 and 45. The channel icons 37 and 47 can be respectively displayed in the border regions 33 and 43 parallel to the left shorter sides of the main screen 30 and sub-screen 40. The volume icons 35 and 45 can be respectively displayed in the border regions 31 and 41 parallel to the upper longer sides of the main screen 30 and sub-screen 40.

As the control icons 35, 37, 45 and 47 have a similar construction, the following description thereon is focused on the control icons 35 and 37 displayed on the main screen 30. The channel icon 37 has a preset length, and includes control portions 37a and 37c at the opposite ends and an icon hiding portion 37b between the control portions 37a and 37c. A channel identifier of the current main channel can be displayed in the icon hiding portion 37b. An audio volume level of the current main channel can be displayed in an icon hiding portion 35b of the volume icon 35.

When a touch event occurs to the control portion 37a or 37c of the channel icon 37, the PIP display controller 27 switches the current channel associated with the main screen 30 to a different channel. When a touch event occurs to a control portion 35a or 35c of the volume icon 35, the PIP display controller 27 adjusts the audio volume of the current channel associated with the main screen 30.

As display of the control icons 35, 37, 45 and 47 tends to conceal video images on the display screen 29, the control icons 35, 37, 45 and 47 are preferably hidden after channel switching or volume adjustment. When a touch event occurs to an icon hiding portion 35b, 37b, 45b or 47b of the control icon 35, 37, 45 or 47, the icon controller 25 hides the control icon 35, 37, 45 or 47 from the display screen 29. When a preset time duration expires after occurrence of the most recent touch event to the display screen 29, the icon controller 25 also hides the control icons 35, 37, 45 and 47.

Although control icons are described in relation to volume adjustment or channel switching, they may also be related to various menus necessary for controlling current digital broadcasts, for example, program schedules and channel information.

When a drag event occurs, the PIP display controller 27 adjusts digital broadcasts associated with the main screen 30 and sub-screen 40 according to the length and direction of the corresponding drag. For example, according to the length and direction of a drag event, the PIP display controller 27 exchanges the broadcast channels associated with the main screen 30 and sub-screen 40, resizes the sub-screen 40, or moves the sub-screen 40 on the main screen 30.

Figure 4:
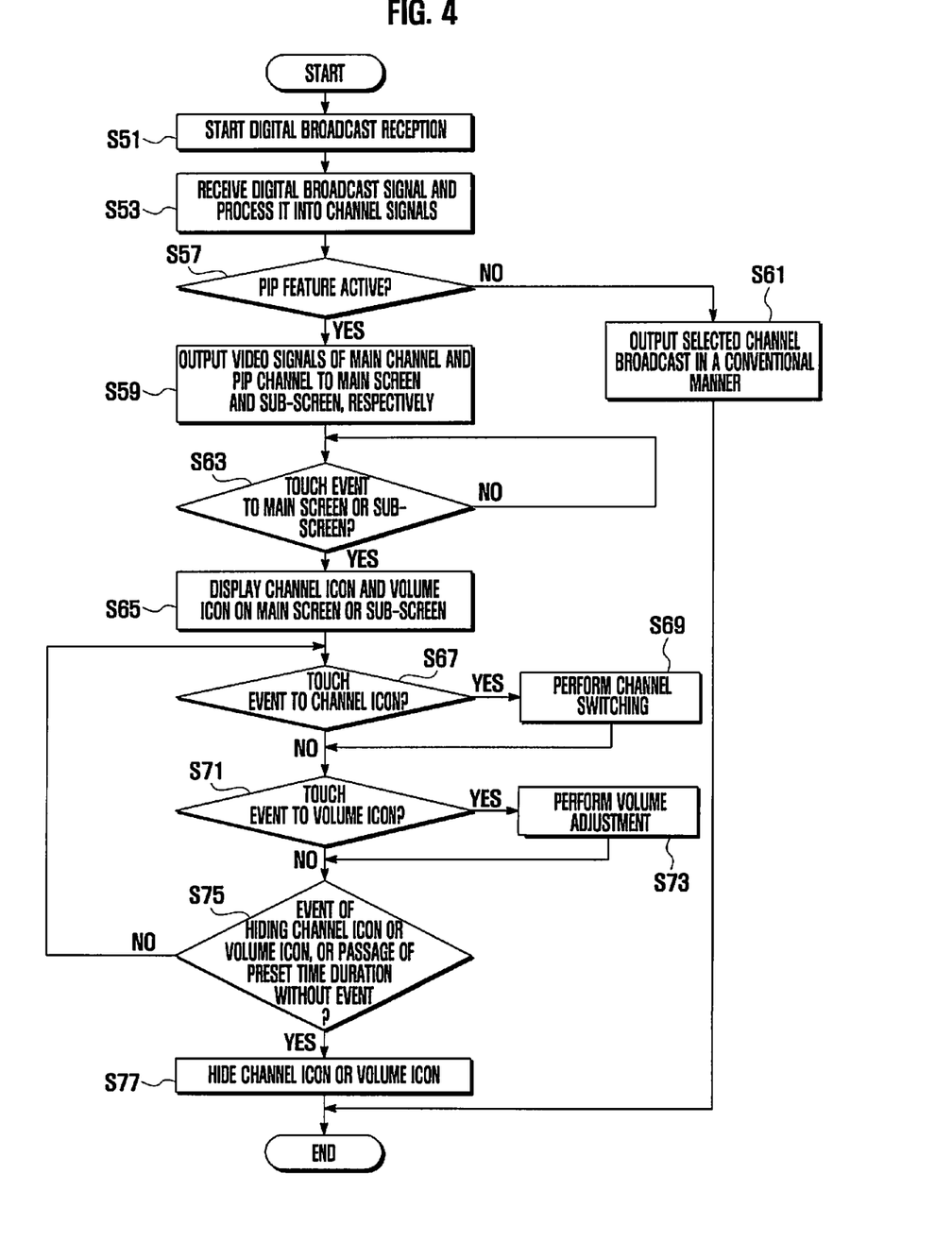
FIG. 4 is a flow chart illustrating a picture-in-picture (PIP) display control method according to the present invention.

FIG. 4 shows an example of a PIP display control method according to the present invention. Referring to FIGS. 1 to 4, the PIP display control method is described as follows.

When the user enters a command of digital broadcast reception at step S51, the control unit 11 controls the broadcast receiving unit 15 to start reception of a digital broadcast signal via the antenna ANT, and also controls the signal processor 17 to process the received digital broadcast signal into channel signals on individual channels at step S53. At step S51, a command of digital broadcast reception can be input through touching of the display unit 19 or through a digital broadcast reception key provided in the mobile terminal 10.

The control unit 11 determines whether a PIP feature is active at step S57. If a PIP feature is active, the control unit 11 controls the signal processor 17 to output a video signal of a selected main channel to the main screen 30 for display, to output a video signal of another selected PIP channel to the sub-screen 40 for display, and to output an audio signal of the main channel to the audio output unit 23 for reproduction at step S59. If a PIP feature is not active, the control unit 11 controls the signal processor 17 to output video and audio signals of a selected channel in a conventional manner at step S61.

The touch signal processor 21 checks at regular intervals whether a touch event occurs to the main screen 30 or sub-screen 40 at step S63. If a touch event to the main screen 30 or sub-screen 40 is detected, the icon controller 25 displays control icons 35 and 37 on the main screen 30 or control icons 45 and 47 on the sub-screen 40 at step S65.

As channel switching and volume adjustment through the main screen 30 are similar to those through the sub-screen 40, the following description is focused on channel switching and volume adjustment through the main screen 30.

When a touch event occurs to one of the control portions 37a and 37c of the channel icon 37 at step S67, the PIP display controller 27 switches the current main channel associated with the main screen 30 to the previous or next available channel at step S69. For example, occurrence of a touch event to the upper control portion 37a causes the current main channel to change to the next channel, and occurrence of a touch event to the lower control portion 37c causes the current main channel to change to the previous channel.

When a touch event occurs to one of control portions 35a and 35c of the volume icon 35 at step S71, the PIP display controller 27 adjusts the audio volume of the current main channel associated with the main screen 30 at step S73. For example, occurrence of a touch event to the left control portion 35a results in a decrease in the audio volume, and occurrence of a touch event to the right control portion 35c results in an increase in the audio volume. A touch to the left control portion 35a that is sustained for a preset time duration leads to muting of the audio sound of the main channel. A touch to the right control portion 35c that is sustained for a preset time duration returns the muted audio sound of the main channel to the previous volume level.

Accordingly, channel switching and volume adjustment of the main channel through touching of the main screen 30 can be performed independently of those of the sub-channel through touching of the sub-screen 40.

Because the control icons 35, 37, 45 and 47 tend to hide video images on the main screen 30 and the sub-screen 40, they are preferably hidden after channel switching or volume adjustment. When the touch signal processor 21 detects a touch event to an icon hiding portion 35b, 37, 45 or 47 of the control icon 35, 37, 45 or 47, or when a preset time duration has elapsed after occurrence of the most recent touch event to the control icon 35, 37, 45 or 47 without occurrence of a new touch event at step S75, the icon controller 25 hides the corresponding control icon 35, 37, 45 or 47 at step S77.

Figure 5:
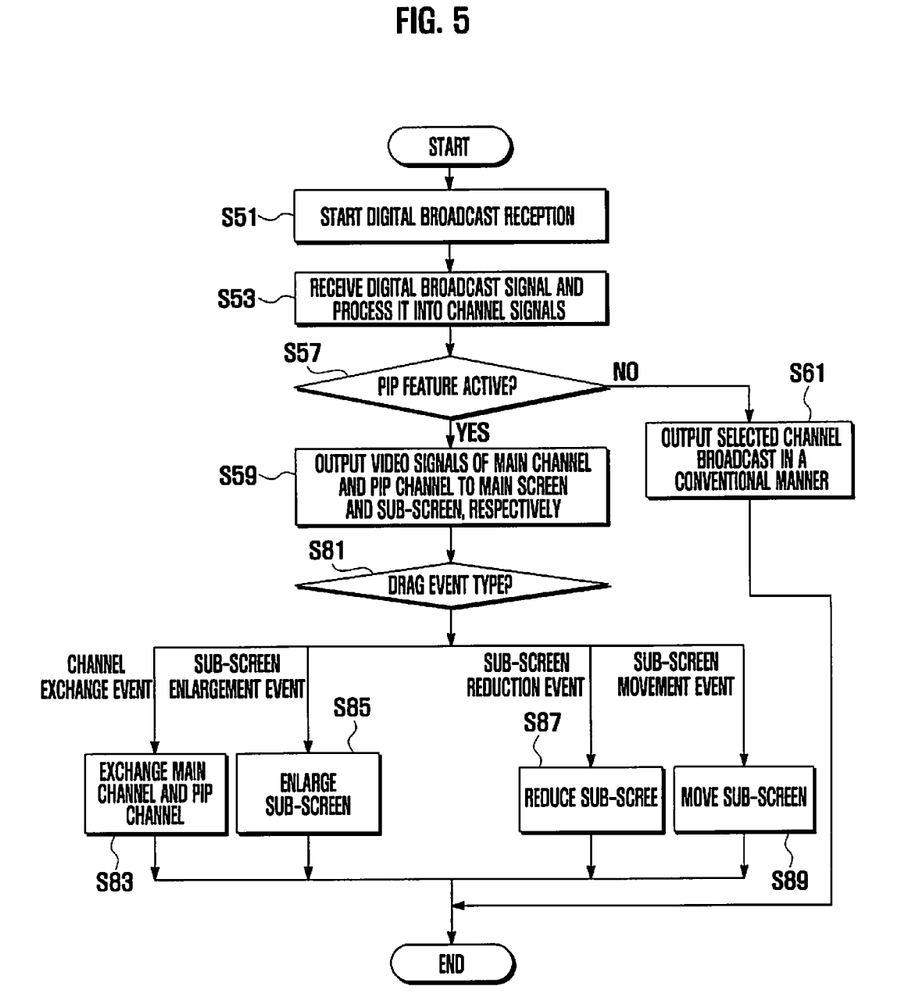
FIG. 5 is a flow chart illustrating a PIP display control method according to another embodiment of the present invention.

FIG. 5 shows another example of a PIP display control method according to the present invention, and FIGS. 6A to 9B shows screen representations for the method of FIG. 5. Referring to FIG. 1 and FIGS. 6A to 9B, the PIP display control method of the FIG. 5 is described as follows.

As steps S51 to S61 in the method of FIG. 5 are identical to corresponding steps S51 to S61 in the method of FIG. 4, a description thereof is omitted.

During activation of a PIP feature, when a drag event occurs to the main screen 30 or sub-screen 40, the touch signal processor 21 identifies the type of the drag event, and informs the PIP display controller 27 of the identified type at step S81.

Figure 6A:
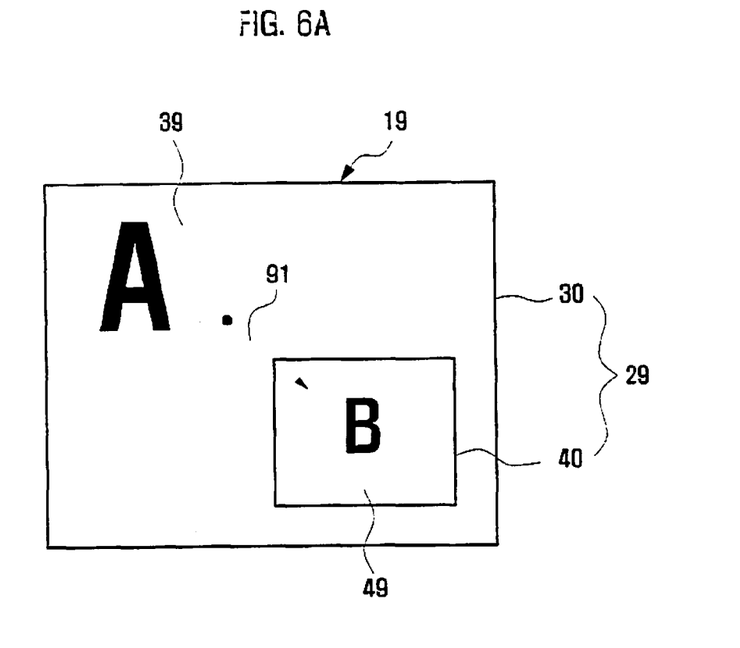
Figure 7A:
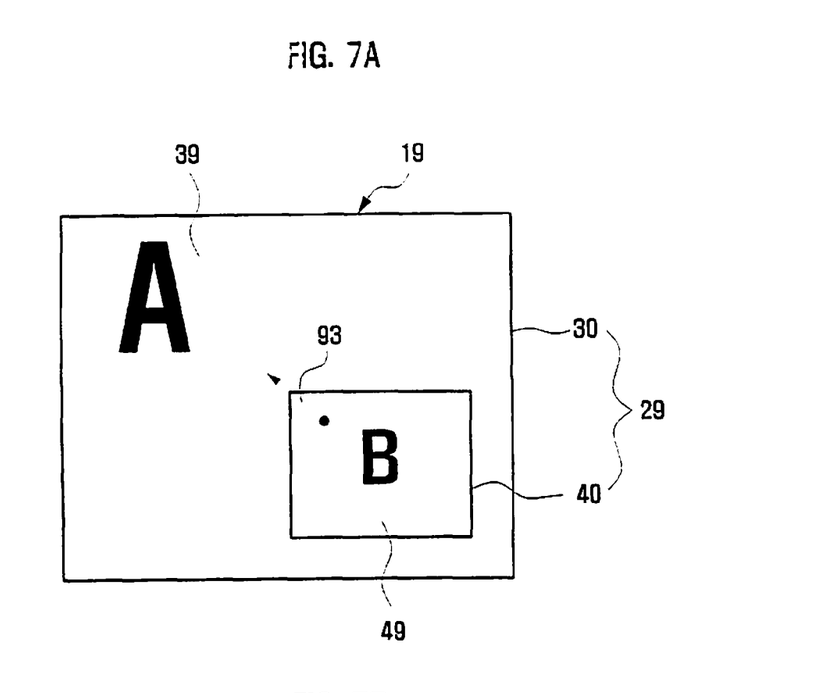
Figure 8A:
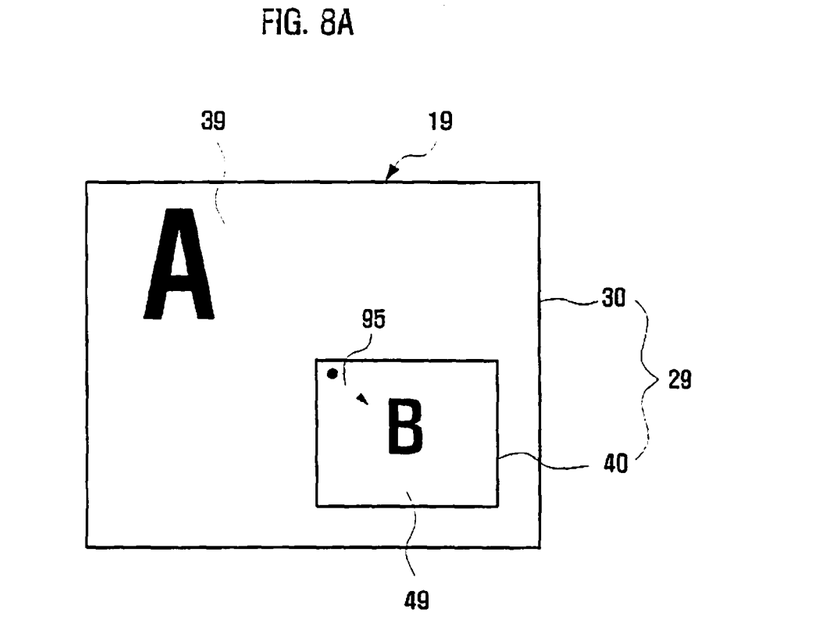
Figure 9A:
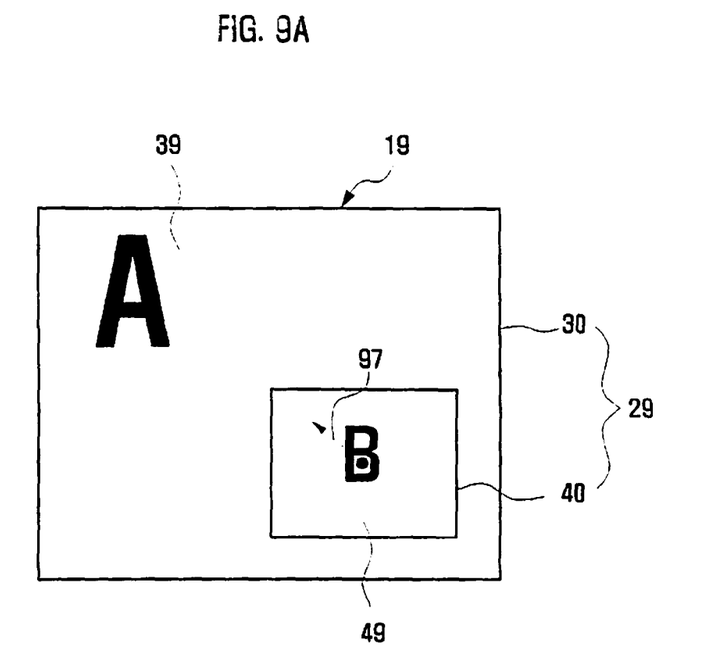

A drag event can be one of a channel exchange event, sub-screen enlargement event, sub-screen reduction event, and sub-screen movement event. The channel exchange event corresponds to a drag from the main screen 30 to the sub-screen 40, as shown in FIG. 6A. The sub-screen enlargement event corresponds to a drag from the sub-screen 40 to the main screen 30, as shown in FIG. 7A. The sub-screen reduction event corresponds to a drag from the border of the sub-screen 40 to the center thereof, as shown in FIG. 8A. The sub-screen movement event corresponds to a drag from the center of the sub-screen 40 to the border thereof, as shown in FIG. 9A.

Figure 6B:
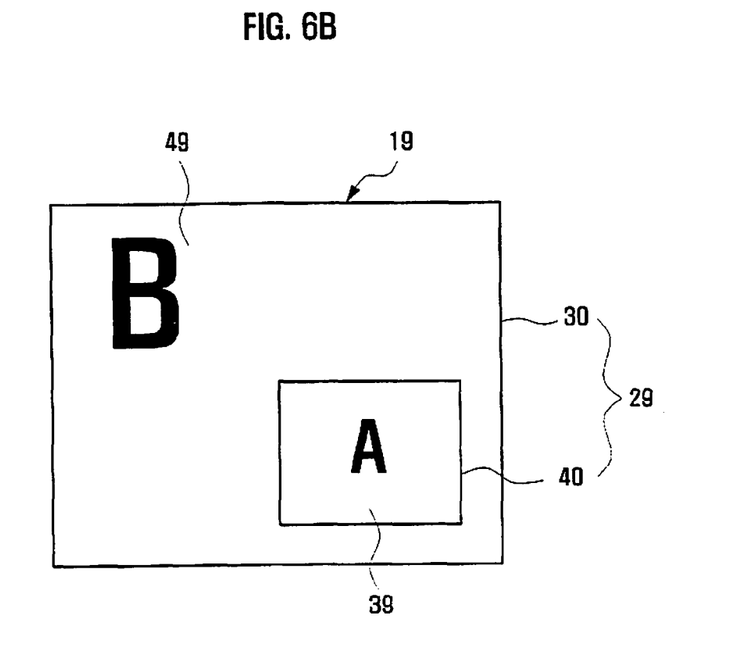

If the drag event is a channel exchange event 91 as shown in FIG. 6A, the PIP display controller 27 exchanges the main channel associated with the main screen 30 and the PIP channel associated with the sub-screen 40 at step S83. Consequently, the former PIP channel becomes a new main channel, and the former main channel becomes a new PIP channel, as shown in FIG. 6B.

Figure 7B:
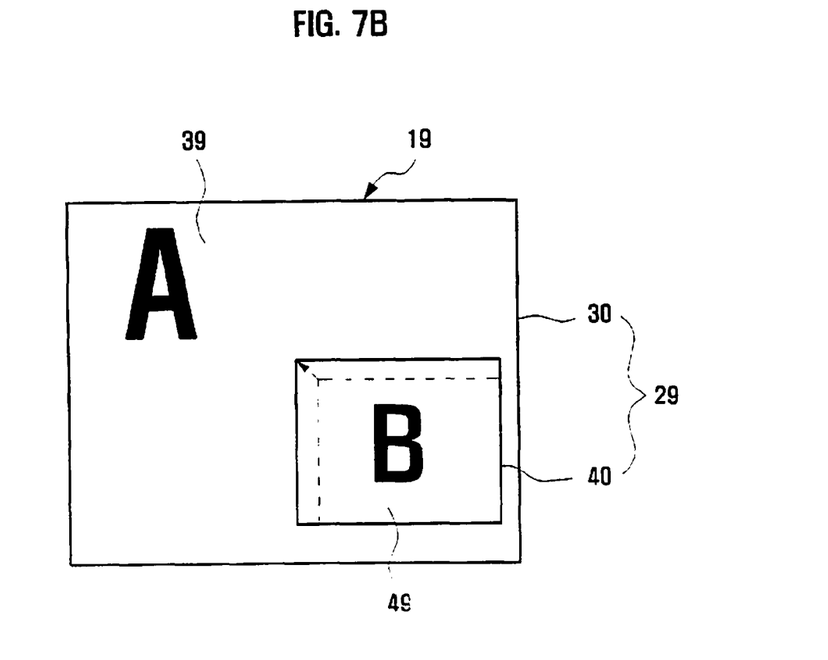

If the drag event is a sub-screen enlargement event 93, as shown in FIG. 7A, the PIP display controller 27 enlarges the sub-screen 40 at step S85, as shown in FIG. 7B. The sub-screen 40 is enlarged corresponding to the length and direction of the drag. Video images on the sub-screen 40 are also enlarged accordingly.

Figure 8B:
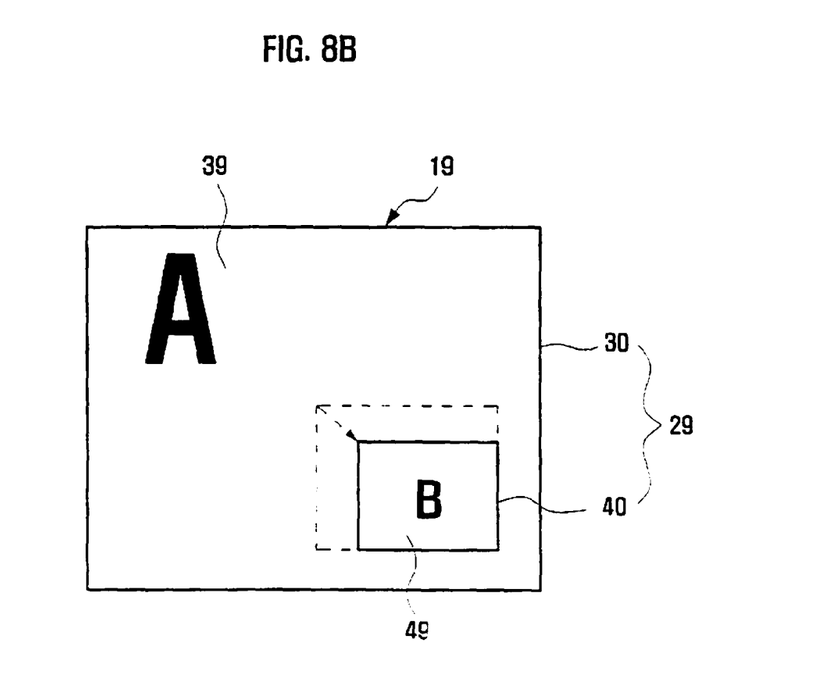

If the drag event is a sub-screen reduction event 95 as shown in FIG. 8A, the PIP display controller 27 reduces the sub-screen 40 at step S87, as shown in FIG. 8B. The sub-screen 40 is reduced corresponding to the length and direction of the drag.

At step S85 or S87, when control icons (not shown) are being displayed on the sub-screen 40, they also are resized according to resizing of the sub-screen 40. In addition, the sub-screen 40 is resized according to the length and direction of the corresponding drag. For example, when the drag is parallel to horizontal sides of the sub-screen 40, the sub-screen 40 is resized in the horizontal direction. When the drag is parallel to vertical sides of the sub-screen 40, the sub-screen 40 is resized in the vertical direction. When the drag passes a vertex of the diagonal of the sub-screen 40 in the direction of the diagonal, the sub-screen 40 is resized in the direction of the diagonal while preserving the width-to-height ratio of the sub-screen 40.

Figure 9B:
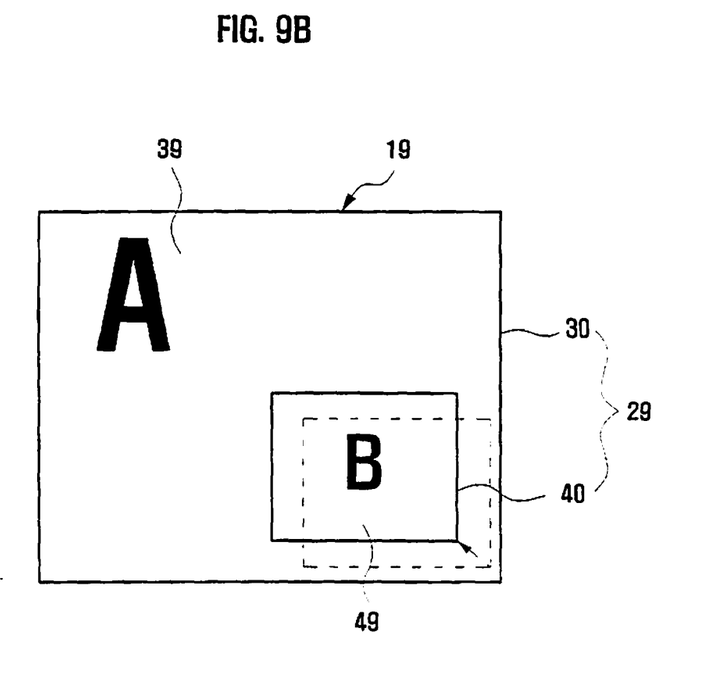

If the drag event is a sub-screen movement event 97, as shown in FIG. 9A, the PIP display controller 27 moves the sub-screen 40 in the direction of the drag at step S89, as shown in FIG. 9B.

As apparent from the above description, the present invention provides a mobile terminal capable of digital broadcast reception and supporting a touch screen function, and also provides a PIP display control method enabling separate control of a main screen and a sub-screen for the mobile terminal. That is, through touching operations, channel switching and volume adjustment for a broadcast channel associated with the main screen can be performed independently of those for a broadcast channel associated with the sub-screen. Through drag operations, the broadcast channels associated with the main screen and sub-screen can be exchanged with each other, and the sub-screen can be resized and moved.

While preferred embodiments of the present invention have been shown and described in this specification, it will be understood by those skilled in the art that various changes or modifications of the embodiments are possible without departing from the spirit and scope of the invention as defined by the appended claims. For example, although, in the description, a channel icon and volume icon are bar type icons and separately displayed on the main or sub screen, they may also be combined into a single cross type icon, whose vertical part is used to switch broadcast channels, whose horizontal part is used to adjust the audio volume, and whose central region is used to hide the cross type icon.

What is claimed is:

1. A picture-in-picture (PIP) display control method for a mobile terminal that is capable of digital broadcast reception and supports a touch screen function, the method comprising:
    processing a received digital broadcast signal into channel signals of individual channels;
    displaying video data of a selected channel signal on a main screen occupying an entire display area, and displaying video data of another selected channel signal on a sub-screen in the main screen;
    checking whether a touch event occurs to at least one of the main screen and the sub-screen;
    generating and displaying control icons on the main screen when the touch event occurs to the main screen and control icons on the sub-screen when a touch event occurs to the sub-screen; and
    controlling digital broadcasts on a channel associated with the main screen in response to occurrence of the touch events to the control icons of the main screen and digital broadcasts on a channel associated with the sub-screen in response to occurrence of the touch events to the control icons of the sub-screen.

2. The PIP display control method of claim 1, wherein the control icons comprise channel switching icons and volume adjustment icons.

3. The PIP display control method of claim 2, wherein the control icons are displayed at border regions of the corresponding main screen and sub-screen.

4. The PIP display control method of claim 3, wherein each control icon has a preset size and comprises control portions at opposite ends and an icon hiding portion between the control portions.

5. The PIP display control method of claim 4, wherein the control icons displayed on the sub-screen are resized according to size-adjustment of the sub-screen.

6. The PIP display control method of claim 4, wherein the controlling step comprises switching a current channel associated with the touched channel switching icon to a new channel in response to occurrence of a touch event to one of the control portions of a channel switching icon.

7. The PIP display control method of claim 4, wherein the controlling step comprises adjusting audio volume of a channel associated with the touched volume adjustment icon in response to occurrence of a touch event to one of the control portions of a volume adjustment icon.

8. The PIP display control method of claim 4, further comprising hiding the touched control icon from the main screen or sub-screen in response to occurrence of a touch event to the icon hiding portion of a control icon.

9. The PIP display control method of claim 1, further comprising hiding the touched control icon from the main screen or sub-screen when a preset time duration has elapsed after occurrence of the most recent touch event to a control icon.

10. The PIP display control method of claim 1, wherein the controlling step comprising adjusting digital broadcasts on the channels associated with the main screen and sub-screen according to size and direction of the corresponding drag when an occurred touch event is a drag event.

11. The PIP display control method of claim 10, wherein according to size and direction of the drag, activity occurs selected from the group consisting of exchanging the channels associated with the main screen and sub-screen with each other, resizing the sub-screen, and moving the sub-screen.

12. A mobile terminal capable of digital broadcast reception, comprising:
a display unit having a touch screen capability for displaying video images;
a broadcast receiving unit for receiving a digital broadcast signal;
a signal processor for processing the received digital broadcast signal into channel signals of individual channels, displaying video data of a selected channel signal on a main screen occupying an entire display area of the display unit, and displaying video data of another selected channel signal on a sub-screen in the main screen, to support a picture-in-picture (PIP) feature;
a touch signal processor for detecting a touch event to at least one of the main screen and the sub-screen, and obtaining position data of the detected touch event;
an icon controller for generating and displaying control icons on the main screen when detecting occurrence of a touch event to the main screen and control icons on the sub screen when detecting occurrence of a touch event to the sub-screen based on position data obtained by the touch signal processor; and
a PIP display controller for controlling digital broadcasts on channels associated with the main screen in response to the occurrence of the touch events to the control icons of the main screen and digital broadcasts on channel associated with the sub-screen in response to the occurrence of the touch events to the control icons of the sub-screen.

13. The mobile terminal of claim 12, wherein the control icons comprises channel switching icons and volume adjustment icons.

14. The mobile terminal of claim 13, wherein the icon controller displays the control icons at border regions of the corresponding main screen and sub-screen.

15. The mobile terminal of claim 14, wherein each control icon has a preset size, and comprises control portions at opposite ends and an icon hiding portion between the control portions.

16. The mobile terminal of claim 15, wherein the control icons displayed on the sub-screen are resized according to size-adjustment of the sub-screen.

17. The mobile terminal of claim 15, wherein the PIP display controller switches a current channel associated with the touched channel switching icon to a new channel in response to occurrence of a touch event to one of the control portions of a channel switching icon.

18. The mobile terminal of claim 15, wherein the PIP display controller adjusts audio volume of a channel associated with the touched volume adjustment icon in response to occurrence of a touch event to one of the control portions of a volume adjustment icon.

19. The mobile terminal of claim 15, wherein the icon controller hides the touched control icon from the main screen or sub-screen in response to occurrence of a touch event to the icon hiding portion of a control icon.

20. The mobile terminal of claim 12, wherein the icon controller hides the touched control icon from the main screen or sub-screen when a preset time duration has elapsed after occurrence of the most recent touch event to a control icon.

21. The mobile terminal of claim 12, wherein the PIP display controller adjusts digital broadcasts on the channels associated with the main screen and sub-screen according to size and direction of the corresponding drag when an occurred touch event is a drag event.

22. The mobile terminal of claim 21, wherein according to size and direction of the drag, the PIP display controller effects activity selected from the group consisting of exchanging the channels associated with the main screen and sub-screen, resizing the sub-screen, and moving the sub-screen.

* * * * *